US012612285B2

(12) United States Patent
Aitamurto et al.

(10) Patent No.: US 12,612,285 B2
(45) Date of Patent: Apr. 28, 2026

(54) ELEVATOR SAFETY SYSTEM, ELEVATOR SYSTEM, AND METHOD FOR ELEVATOR CAR COLLISION PROTECTION

(71) Applicant: KONE Corporation, Helsinki (FI)

(72) Inventors: Juha-Matti Aitamurto, Helsinki (FI); Ari Kattainen, Helsinki (FI)

(73) Assignee: KONE Corporation, Helsinki (FI)

( * ) Notice: Subject to any disclaimer, the term of this patent is extended or adjusted under 35 U.S.C. 154(b) by 1239 days.

(21) Appl. No.: 17/468,993

(22) Filed: Sep. 8, 2021

(65) Prior Publication Data

US 2022/0106154 A1 Apr. 7, 2022

(30) Foreign Application Priority Data

Oct. 2, 2020 (EP) .................................... 20199824

(51) Int. Cl.

| | |
|---|---|
| ***B66B 5/00*** | (2006.01) |
| ***B66B 1/24*** | (2006.01) |
| ***B66B 5/02*** | (2006.01) |
| *B66B 9/00* | (2006.01) |
| *B66B 11/04* | (2006.01) |

(52) U.S. Cl.

CPC .............. *B66B 5/0031* (2013.01); *B66B 1/24* (2013.01); *B66B 5/02* (2013.01); *B66B 9/003* (2013.01); *B66B 11/0407* (2013.01)

(58) Field of Classification Search

CPC .......... B66B 5/0031; B66B 1/24; B66B 5/02; B66B 9/003; B66B 11/0407

See application file for complete search history.

(56) References Cited

U.S. PATENT DOCUMENTS

| | | | | |
|---|---|---|---|---|
| 6,554,107 | B2 * | 4/2003 | Yumura | B66B 1/3415 187/394 |
| 11,434,104 | B2 * | 9/2022 | Fargo | B66B 5/18 |
| 11,667,494 | B2 * | 6/2023 | Kattainen | B66B 5/0056 187/247 |

FOREIGN PATENT DOCUMENTS

| | | | |
|---|---|---|---|
| JP | 4-361960 | A | 12/1992 |
| WO | WO 2016/116146 | A1 | 7/2016 |

OTHER PUBLICATIONS

European Search Report and Search Opinion, issued in Application No. 20 19 9824, dated Mar. 9, 2021.

* cited by examiner

*Primary Examiner* — Ryan J. Walters
(74) *Attorney, Agent, or Firm* — Birch, Stewart, Kolasch & Birch, LLP

(57) ABSTRACT

An elevator safety system includes an elevator car safety unit arranged on or at least in mechanical connection, preferably in fixed manner, with an elevator car; at least one distance measurement target; and a distance measurement device mounted on the elevator car for determining a distance between the distance measurement target and the distance measurement device. The elevator car safety unit is arranged in connection with the distance measurement device and is configured to generate an output signal based on the determined distance.

12 Claims, 4 Drawing Sheets

ELEVATOR SAFETY SYSTEM, ELEVATOR SYSTEM, AND METHOD FOR ELEVATOR CAR COLLISION PROTECTION

FIELD OF THE INVENTION

The present invention relates in general to elevators. In particular, however not exclusively, the present invention concerns elevator safety systems and methods for elevator systems having several elevator cars movable within the same elevator shaft.

BACKGROUND

There are known elevators in which several elevator cars are movable in the same elevator shaft. Collision of the elevator car to any object on travel path in the elevator shaft may result in a loss of passenger life. Thus, there is a need to develop solutions for collision prevention.

SUMMARY

An objective of the present invention is to provide an elevator safety system, an elevator system, and a method for elevator car collision protection. Another objective of the present invention is that the elevator safety system, the elevator system, and the method at least reduce the risk of collision of an elevator car to other elevator cars and/or devices or structures in the elevator shaft.

The objectives of the invention are reached by an elevator safety system, an elevator system, and a method for collision protection in an elevator system as defined by the respective independent claims.

According to a first aspect, an elevator safety system is provided. The elevator safety system comprises an elevator car safety unit arranged on or at least in mechanical connection, preferably in fixed manner, with an elevator car. The elevator safety system further comprises at least one distance measurement target and a distance measurement device mounted on the elevator car for determining a distance between the distance measurement target and the distance measurement device. In preferable embodiments, the distance may be determined in a direction of the movement of the elevator car, such as in a longitudinal direction of an elevator shaft. The elevator car safety unit is arranged in connection with the distance measurement device and configured to generate an output signal based on the determined distance.

Furthermore, the elevator car safety unit may be configured to initiate stopping of the elevator car based on the determined distance, for example, when the determined distance is lower than a safety distance.

In some embodiments, the elevator car safety unit may be configured to determine a speed of the elevator car, and to initiate stopping, such as via the output signal, of the elevator car based on the speed and the determined distance, and, optionally, the movement direction of the elevator car with respect to the distance measurement target, such as whether approaching or moving away from the distance measurement target.

In various embodiments, the distance measurement target may be a static object, such as a mechanical flag or a surface portion or a reflector, or other counter part for the distance measurement device for determining the distance.

In various embodiments, the at least one distance measurement target may be arranged on an elevator car, that is to another elevator car with respect to the one with the distance measurement device, at an end of the elevator shaft, or to temporarily reserve a section of the elevator shaft for maintenance operations.

Furthermore, the at least one distance measurement target may be comprised in a safety device. In addition, the at least one safety device may be arranged to change a position of the distance measurement target between an active position and an inactive position. Still further, in the active position, the distance measurement target may be arranged so that the distance can be determined, such as being extended to a position in which the distance measurement device is capable of determining the distance therebetween. Alternatively or in addition, the at least one safety device may comprise an actuator and a support element for the distance measurement target, wherein the actuator and the support element are configured to change the position of the distance measurement target.

In some embodiments, the at least one safety device may be arranged at a door zone of the elevator shaft or at a turning station of the elevator shaft, or to reserve a section of the elevator shaft for maintenance operations.

Alternatively or in addition, the elevator safety system may comprise an elevator control unit configured to operate the at least one safety device, such as changing the position thereof.

Still further, the at least one safety device may be arranged at the turning station and the position of the distance measurement target is adapted based on a position of the turning station and/or a status of the turning station locking device.

In some embodiments, the elevator car safety unit may, in addition, be arranged to control the movement of the elevator car during normal operating conditions, such as controlling the mover of the linear motor, for instance.

According to a second aspect, an elevator system is provided. The elevator system comprises a linear motor arranged to move at least one elevator car, preferably a plurality of elevator cars, in an elevator shaft. The elevator system further comprises the elevator safety system in accordance with the first aspect.

According to a third aspect, a method for elevator car collision protection is provided. The method comprises:

- determining, by a distance measurement device on an elevator car, a distance of the elevator car from a distance measurement target arranged to an elevator shaft or to another elevator car, and
- initiating a stopping of the elevator car based on the determined distance.

In some embodiments, the method may comprise determining a speed of the elevator car, wherein the initiating may then comprise initiating the stopping based on the determined distance and the speed, and, optionally, the movement direction of the elevator car relative to the distance measurement target and/or the safety device.

The present invention provides an elevator safety system, an elevator system, and a method for elevator car collision protection. The present invention provides advantages over known solutions in that it allows several elevator cars to be moved within same elevator shaft and improves the safety of related to the movement thereof. The risk of collision is at least reduced if not completely prevented. Furthermore, various embodiments of the present invention allow maintenance work in some sections of the elevator shaft and/or extension of the elevator shaft in multiple different construction phases since the safety system can be configured to prevent, permanently or temporarily, movement of the elevator car(s) to some sections of the shaft.

Various other advantages will become clear to a skilled person based on the following detailed description.

The terms "first", "second", etc., are used herein to distinguish one element from other element, and not to specially prioritize or order them, if not otherwise explicitly stated.

The exemplary embodiments of the present invention presented herein are not to be interpreted to pose limitations to the applicability of the appended claims.

The verb "to comprise" is used herein as an open limitation that does not exclude the existence of also unrecited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1:
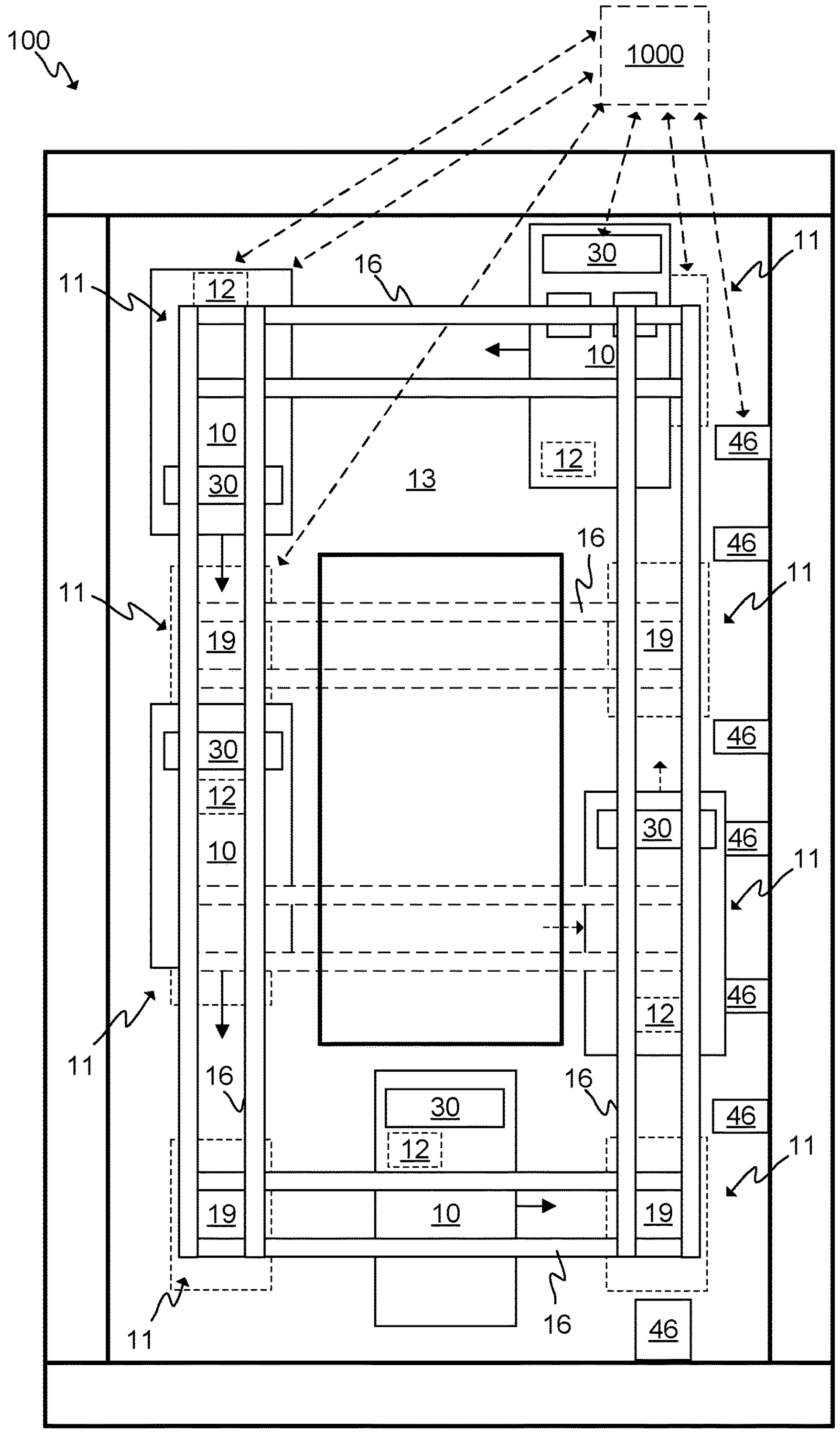
FIG. 1 illustrates schematically an elevator system according to an embodiment of the present invention.

FIG. 1 illustrates schematically an elevator system 100 according to an embodiment of the present invention. The elevator system 100 may comprise at least one or a plurality of elevator cars 10 moving in the elevator shaft 13 or the elevator car pathway 13. The elevator car(s) 10 may comprise a first electrical converter unit 12, such as comprising a frequency converter or an inverter, and/or a first energy storage such as a battery or batteries. The first electrical converter unit 12 may be utilized for operating a mover arranged to the elevator car 10 for moving the car 10 along the elevator shaft 13. There may also be other electrically operated equipment in the elevator car 10 such as lighting, doors, user interface, emergency rescue equipment, etc. The first electrical converter unit 12 or a further electrical converter unit, such as an inverter or a rectifier, may be utilized for operating one or several of said other equipment of the elevator car 10. The first energy storage may, preferably, be electrically coupled to the first electrical converter unit 12, for example, to the intermediate circuit of the frequency converter, for providing electrical power to the first electrical converter unit 12 and/or for storing electrical energy provided by the first electrical converter unit or a further electrical converter unit or other electrical power source.

There are preferably at least two landing floors, having landing floor doors 19 or openings 19, comprised in the elevator system 100. There may also be doors comprised in the elevator car 10. Although shown in FIG. 1 that there are two horizontally separated sets, or "columns", of vertically aligned landing floors, there could as well be only one column as in conventional elevators or more than two, for example, three.

Regarding the elevator shaft 13, it may be such as defining substantially closed volume in which the elevator car 10 is adapted and configured to be moved. The walls may be, for example, of concrete, metal or at least partly of glass, or any combination thereof. The elevator shaft 13 herein refers basically to any structure or pathway along which the elevator car 10 is configured to be moved.

As can be seen in FIG. 1 with respect to the elevator system 100, which is a multi-car elevator system, the elevator car 10 or cars 10 may be moved along the elevator shaft 13 vertically and/or horizontally depending on the direction of stator beams 16. According to embodiments similar to one in FIG. 1 in this respect, the elevator car 10 or cars 10 may be configured to be moved along a number of vertical and/or horizontal stator beams 16, for example, two beams such as in FIG. 1. Some of the stator beams 16 are illustrated with dashed lines indicating their optionality. However, it should be realized that there may also be stator beams 16 in the middle part of the shaft 13, such as shown in FIG. 1. Still further, one, several or all stator beams may be inclined.

The stator beams 16 are part of an electric linear motor of the elevator system 100 utilized to move the elevator car 10 or cars 10 in the elevator shaft 13. The stator beams 16 may, preferably, be arranged in fixed manner, that is, stationary with respect to the elevator shaft 13, for example, to a wall of the shaft by fastening portions, which may be arranged to be rotatable at turning stations 11, such as comprising a turning device, for example, a turngear or a turntable or the like.

The elevator system 100 may comprise an elevator control unit 1000 for controlling the operation of the elevator system 100. The elevator control unit 1000 may be a separate device or may be comprised in the other components of the elevator system 100 such as in or as a part of the electrical converter unit 12. The elevator control unit 1000 may also be implemented in a distributed manner so that, e.g., one portion of the elevator control unit 1000 may be comprised in the electrical converter unit 12 and another portion in the elevator car 10. The elevator control unit 1000 may also be arranged in distributed manner at more than two locations or in more than two devices.

The elevator control unit 1000 may comprise one or more processors, one or more memories being volatile or non-volatile for storing portions of computer program code and any data values and possibly one or more user interface units. The mentioned elements may be communicatively coupled to each other with e.g. an internal bus.

The processor of the elevator control unit 1000 may at least be configured to implement at least some method steps as described hereinafter. The implementation of the method may be achieved by arranging the processor to execute at least some portion of computer program code stored in the memory causing the processor, and thus the elevator control unit 1000, to implement one or more method steps as described hereinafter. The processor may thus be arranged to access the memory and retrieve and store any information therefrom and thereto. For sake of clarity, the processor herein refers to any unit suitable for processing information and control the operation of the elevator control unit 1000, among other tasks. The operations may also be implemented with a microcontroller solution with embedded software.

Similarly, the memory is not limited to a certain type of memory only, but any memory type suitable for storing the described pieces of information may be applied in the context of the present invention.

Furthermore, the elevator system 100 may, preferably, comprise safety device(s) 46, such as at the end(s) of the shaft 13 and/or at door zone(s) and/or to temporarily reserve a section of the elevator shaft 13 for maintenance operations, and/or at the turning station(s) 11. These safety devices 46 may be, for example, buffers or movable stops or other known safety devices typically used in the elevator shaft 13.

Still further, the elevator cars 10 may, preferably, comprise elevator car controllers 30 for controlling various functionalities of the elevator car 10. These functionalities may at least comprise movement related operations, such as taking part in, or completely performing, controlling the operation of the mover which is operatively coupled to the elevator car 10 for moving thereof. The elevator car controllers 30 may preferably be arranged in communication connection with the elevator control unit 1000. Furthermore, there may be a car speed and/or position sensor 35 (shown in FIG. 3), such as based on absolute or relative positioning, configured to provide the elevator car controller 30 elevator car speed and/or position information.

Figure 2:
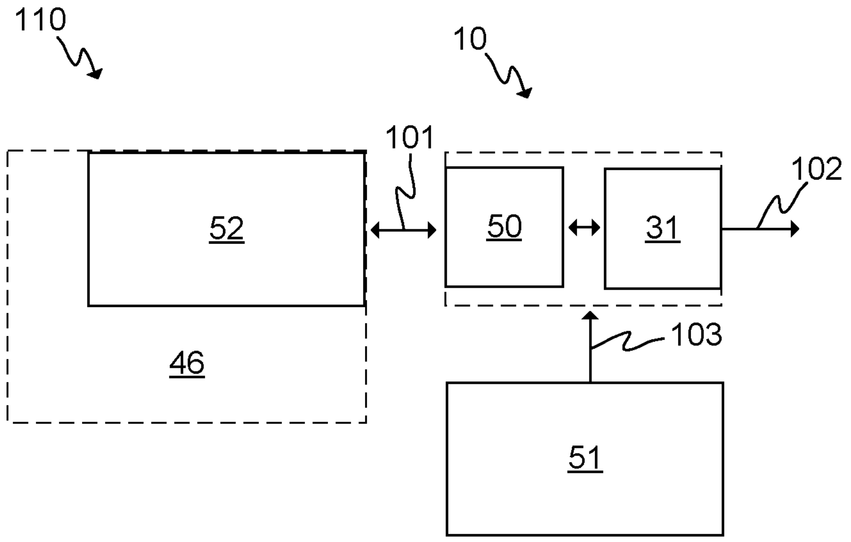
FIG. 2 illustrates schematically an elevator safety system according to an embodiment of the present invention.

FIG. 2 illustrates schematically an elevator safety system 110 according to an embodiment of the present invention. The elevator safety system 110 may comprise an elevator car safety unit 31 arranged on or at least in mechanical connection, preferably in fixed manner, with an elevator car 10. Furthermore, the elevator safety system 110 may comprise at least one distance measurement target 52 arranged in the elevator shaft 13. Still further, the elevator safety system 110 may comprise a distance measurement device 50 arranged on the elevator car 10 for determining a distance 101 between the distance measurement target 52 and the distance measurement device 50. The distance measurement device 50 may be further in connection with the elevator car safety unit 31, such as providing the determined distance thereto. The elevator car safety unit 31 may be arranged in connection with the distance measurement device 50 and configured to generate an output signal 102 based on the determined distance 101. The output signal 102 may, thus, include a stopping command for stopping the elevator car 10. In various embodiments, the determined distance between the target 52 and the distance measurement device 50 is in a direction of the movement of the elevator car 10, in many cases, in the longitudinal direction of the elevator shaft 13.

In various embodiments, the distance measurement target 52 may be, for example, a mechanical flag which may be static or dynamic, such as the position thereof may be changed selectively. A static mechanical flag may be arranged to its position and it mainly maintains its position. An example of a static mechanical flag may be a flag arranged at the end of the elevator shaft 13 to indicate that the elevator car 10 is approaching the end. A dynamic mechanical flag may be such that its position may be changed, such as by an elevator control unit 1000. Thus, the dynamic mechanical flag may be arranged into its active position or to its inactive position. Dynamic mechanical flags may be utilized to selectively prevent or allow the movement of an elevator car 10 too close to or pass the flag. The movement of the elevator car 10 into to a landing or to a turning station 11 may be prevented by a mechanical flag indicating that the car 10 is not to be moved thereinto. There may be, for example, another car 10 at the landing, or the turning station 11 is in an incorrect position or not locked.

Thus, the distance measurement target 52 together with the distance measurement device 50 may be configured to provide information about the distance therebetween, the information which may be utilized to allow or stop the movement of the elevator car 10 if, for example, the distance becomes too small, such as below a safety distance. The stopping may be implemented by a stopping signal 102 provided to stopping devices, such as to brake(s) for stopping the car 10.

Furthermore, the elevator car safety unit 31 may be connected to a safety speed and/or position sensor 51 arrange to determine the speed and/or position of the elevator car 10, such as based on absolute or relative position sensor. The safety speed and/or position sensor 51 may thus be arranged to provide a speed and/or position signals 103 to the elevator car safety unit 31. The signal 103 may also include movement direction related information.

In various embodiments, the distance measurement target 52 may be a static object, such as the static mechanical flag or a surface portion or a reflector, or other counter part for the distance measurement device for determining the distance.

In various embodiments, the at least one distance measurement target 52 may be mounted on an elevator car 10, at an end of the elevator shaft 13, or to temporarily reserve a section of the elevator shaft 13 for maintenance operations.

Furthermore, the at least one distance measurement target 52 may be comprised in a safety device 46, such as at an end of the shaft 13. Optionality of having the distance measurement target 52 comprised particularly in a safety device 46 is indicated by the dashed line in FIGS. 2 and 3. These safety devices 46 may be, for example, buffers or movable stops, for example, a turnable buffer. Alternatively or in addition, a dynamic safety device 46 may be arranged at the door zone of a landing. Still further, the safety device 46 may relate to a turning station 11 of the shaft 13, such as indicating the position of the turning device of the turning station 11 and/or the locking status of the turning station locking device. This will be described in more detail hereinafter.

In some embodiments, the at least one safety device 46 may be arranged to change a position of the distance measurement target 52 between an active position and an inactive position. In the active position, the distance measurement target 52 is, preferably, able to be co-acted with the distance measurement target 50 so that the distance therebetween can be determined.

Furthermore, the at least one safety device 46 may comprise an actuator and a support element for the distance measurement target 52, wherein the actuator and the support element are configured to change the position of the distance measurement target 52. The actuator may, for example, include a motor or other such an actuating device, or be an element of another entity, such as of a turning station 11, which changes its position in response to operation of said entity. Thus, the actuator may be arranged to change the position of the support element to which the distance measurement target 52 is mounted.

In various embodiments, the distance measurement target 52 may, in its active position, be extended to a position in which the distance measurement device 50 can determine the distance therebetween. The operation of the distance measurement device 50 may be based, for example, emitting electromagnetic waves and then, based on the received signal, such as reflected signal. If the distance measurement device 50 is, for example, an ultrasonic, infrared proximity, and/or laser distance measurement device, the distance measurement target 52 may be arranged in its active position to reflect the signal emitted by the distance measurement device 50. In the inactive position, the distance measurement target 52 may be moved, such as retracted, so that there is no reflection back to the distance measurement target 50 or the reflected signal has characteristics which indicate the inactive position and, thereby, the distance measurement target 50 and/or the elevator car safety unit 31 may be configured to recognize the inactive position of the distance measurement target 52.

Thus, in various embodiments, the at least one safety device 46 may be arranged, for example, at a door zone of the elevator shaft 13 or at a turning station 11 of the elevator shaft 13 to control, such as prevent, the movement of the elevator car(s) 10 thereinto, or to reserve a section of the elevator shaft 13 for maintenance operations.

In some embodiments, the elevator car safety unit 31 may configured to determine a speed of the elevator car 10, such as by a safety speed and/or position sensor 51, and to initiate stopping of the elevator car 10 based on the speed and the determined distance 101. Taking the speed into account may be based on an overspeed limit which may be fixed or have a certain profiled, such as decreasing ramp, towards the position of the distance measurement target 52. On the other hand, the current speed may be utilized so that based on the speed and the determined distance, the stopping may be initiated so that the magnitude of the deceleration does not become to high when the elevator car 10 is being stopped before the position of the distance measurement target 52.

In addition, the at least one safety device 46 may be arranged at the turning station 11 and the position of the distance measurement target 52 is adapted based on a position of the turning station 11 and/or a status of the turning station locking device.

In various embodiments, the elevator control unit 1000 may be configured to operate the at least one safety device 46, such as changing its position between operating and non-operating positions. This may in some cases, as described hereinbefore, simultaneously change the position of the distance measurement target 52 between its active and inactive positions.

Figure 3:
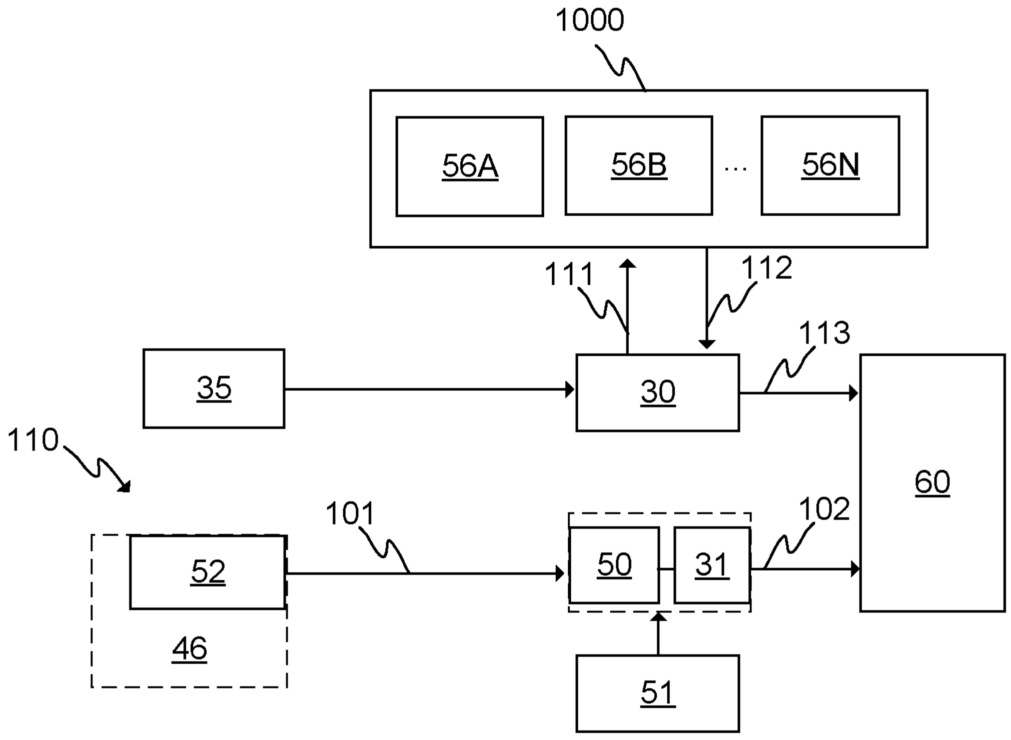
FIG. 3 illustrates schematically an elevator safety system according to an embodiment of the present invention.

FIG. 3 illustrates schematically an elevator safety system 110 according to an embodiment of the present invention. The elevator system 100 may comprise at least the elevator control unit 1000, or a part thereof, such as one or several shaft part safety controllers 56A-56N.

The shaft part safety controller 56A-56N may be configured to monitor and control, such as receive a position, a movement direction, and a speed of at least one elevator car 10 arranged into the elevator shaft part. Such parts may be, for example, one of the following: vertical, horizontal, or inclined shaft part. In FIG. 1, only vertical and horizontal parts are shown. The elevator shaft 13 may thus include two vertical parts and two, or optionally four, horizontal parts as defined by the stator beams 16. The elevator control unit 1000, or the shaft part safety controller(s) 56A-56N, may be configured to determine if the elevator car 10 is allowed to move in certain sections of the elevator shaft 13. Thus, the elevator control unit 1000 may be configured to provide an authorization to the at least one elevator car 10 to move, such as by a linear motor, in a section of the shaft 13.

Furthermore, the elevator system 100 may comprise one or, preferably, several elevator car controllers 30 at least in communication connection with the elevator control unit 1000 or a shaft part safety controller 56A-56N thereof. Item 111 may refer to at least receiving/providing a position, a movement direction, and a speed of at least one elevator car arranged into the elevator shaft 13 or a shaft part thereof. Item 112 may refer to at least providing an authorization to the at least one elevator car to move, such as by a linear motor, in the authorized shaft section of the elevator shaft 13 or a shaft part thereof. Item 113 may refer to a stop signal provided by the elevator controller 30, such as based on the received signal(s) from the elevator control unit 1000.

In various embodiments, the stopping of the elevator car 10 can, thus, be initiated by either the elevator car controller 30 in connection with the elevator control unit 1000, or by the elevator car safety unit 31, such as by the output signal 102, thus involving operating elevator car stopping system 60, such as including elevator car brake(s), and/or braking or safety stop devices in the elevator shaft 13.

Therefore, in accordance with various embodiments, the elevator safety system 110 may, preferably, operate independently with respect to the other safety system including the elevator car controller 30. Thus, if the elevator control unit 100 in connection with the elevator car controller 30 fails to stop the elevator car 10 even if it should, the elevator safety system 110 in accordance with various embodiments can prevent the elevator car 10 from entering or exiting to undesired position of the shaft 13.

Figure 4:
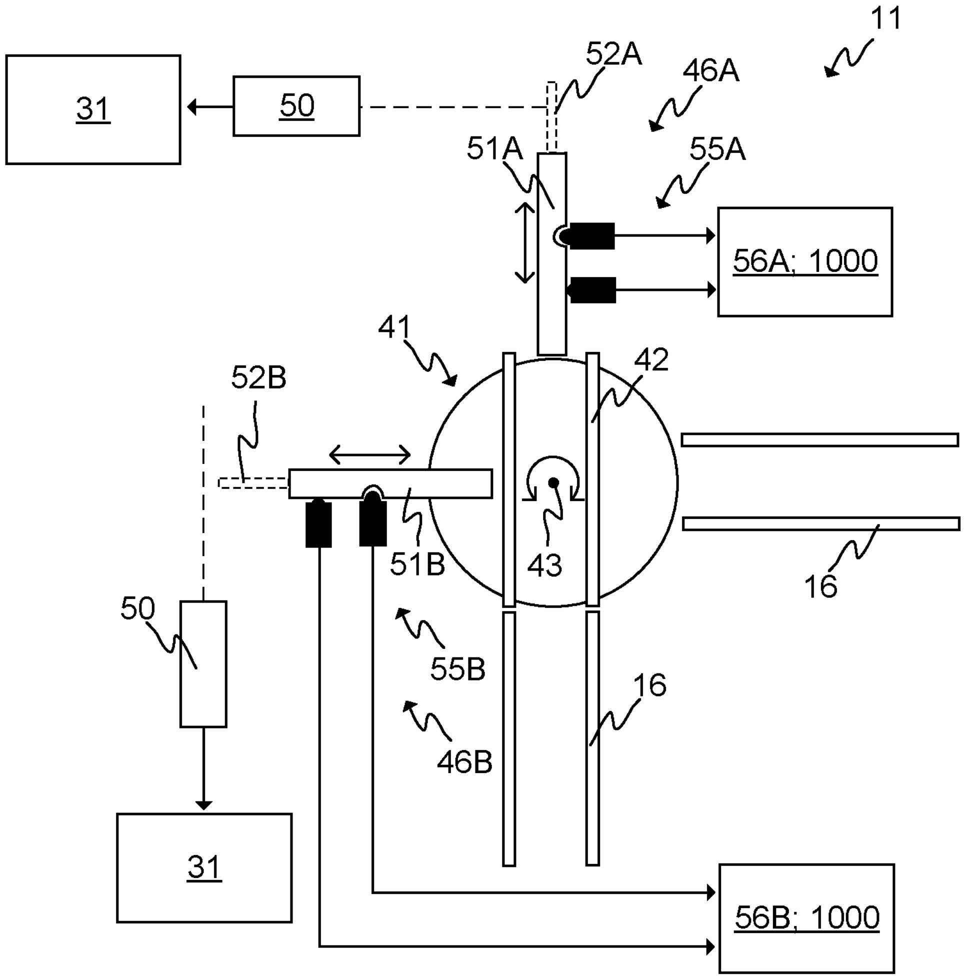
FIG. 4 illustrates schematically a turning station according to an embodiment of the present invention.

FIG. 4 illustrates schematically a turning station 11 according to an embodiment of the present invention. The turning station 11 may comprise a turning device 41. In various embodiments, the turning device 41 may comprise a rotatable platform and in connection thereto stator beam parts 42 of the turning station 11 being similar or corresponding with respect to the stator beams 16 of the electric linear motor of the elevator system 100. In FIG. 4, the turning device 41 resembles a turntable having an axis of rotation 43, for instance. As can be seen in FIG. 4, there are two parallel stator beams 16 extending from below to the turning station 11. Another set of two parallel stator beams 16 extend to the right of the turning station 11.

The primary function of the turning station 11 is thus to enable movement of the elevator car 10 between said two sets of the stator beams 16. Thus, the turning device 41 must be in a correct position with respect to the stator beams 16 from which and/or to which the elevator car 10 is moving in order to avoid derailment of the elevator car 10. The correct position depends, of course, from which the elevator car 10 is approaching the turning station 11 or to which direction is the elevator car 10 is about to move. As becomes clear, the turning device 41 is thus configured to turn or at least allow turning of the stator beam parts 42 of the turning device 41.

The turning station 11 may additionally comprise safety device(s) 46, that is in this case locking devices 46A, 46B of the turning station 11. The purpose of the locking device(s) 46A, 46B is to lock the turning device 41 into its position, thereby, preferably, preventing it from turning at least as long as the locking devices 46A, 46B are in their locked states, that is have locked statuses.

The elevator system 100 may be configured to monitor the status of the locking devices 46A, 46B with two independent sensor systems. The systems may be different types of systems with respect to each other as will be illustrated in FIG. 4. If the turning station 11 is not in the correct position while elevator car 10 enters or exits the station 11, the elevator car 10 can fall of the shaft beams 16. This can advantageously be prevented by various embodiments as described herein.

Regarding said one of the independent sensor systems, the locking devices 46A, 46B comprise a lock plunger 51A, 51B and locking device sensor 55A, 55B operatively coupled to the lock plunger 51A, 51B for determining the position of the lock plunger 51A, 51B and, thereby the status of the locking device 46A, 46B. The locking device sensor 55A, 55B may comprise two sensor elements (shown with black fill color in FIG. 4) adapted so that one of them is arranged to indicate whether the lock plunger 51A, 51B is in a fully extended state, that is the lock is open, or in some other state. The other one of the two sensor elements is arranged to indicate whether the lock plunger 51A, 51B is in a fully retracted state, that is the lock is closed, or in some other state.

One of the sensors 55A may be further arranged to provide readings thereof to an elevator control unit 1000 or to a first shaft part safety controller 56A in communication connection with the elevator control unit 1000. The first shaft part safety controller 56A may, alternatively or in addition, be comprised in the elevator control unit 1000. The other one of the sensors 55B may be further arranged to provide readings thereof to an elevator control unit 1000 or to a second shaft part safety controller 56B in communication connection with the elevator control unit 1000. The second shaft part safety controller 56B may, alternatively or in addition, be comprised in the elevator control unit 1000.

Regarding said other one of the independent sensor systems and in embodiments in accordance with FIG. 4, there may be distance measurement targets 52, that is, in this case, indicative elements 52A, 52B, such as physical flags, mounted on the lock plunger(s) 51A, 51B. The lock plunger (s) 51A, 51B may thus act as actuators of the safety device 46.

There are shown two elevator car safety units 31 which represent the elevator car safety units 31 of different elevator cars 10, such as approaching the turning station 11 from different directions. elevator car safety units 31 may be configured to detect the distance measurement target 52 or the like in other parts of the elevator shaft 13 as well, such as related to an end of the elevator shaft 13 and/or to a door zone of a landing, on similar manner as shown in FIG. 4 with respect to a turning station 11. Thus, when the elevator car 10 approaches the turning station 11, it can be arranged, to determine the status of the turning station 11, such as whether it is in the correct position in view of the elevator car 10.

Thus, additionally, the elevator control unit 1000 may be configured to provide the authorization to the elevator car 10 in order to enter the turning station 11 if the status of the locking devices 46A, 46B so allows and, optionally, if there is no other cars 10 in the turning station 11. In various embodiments, the elevator car safety unit 31 may independently determine the status of the locking devices 46A, 46B, and even initiate stopping of the car 10 which preferably involves operating elevator car stopping system 50, such as including elevator car brake(s), and/or braking or safety stop devices in the elevator shaft 13.

Figure 5:
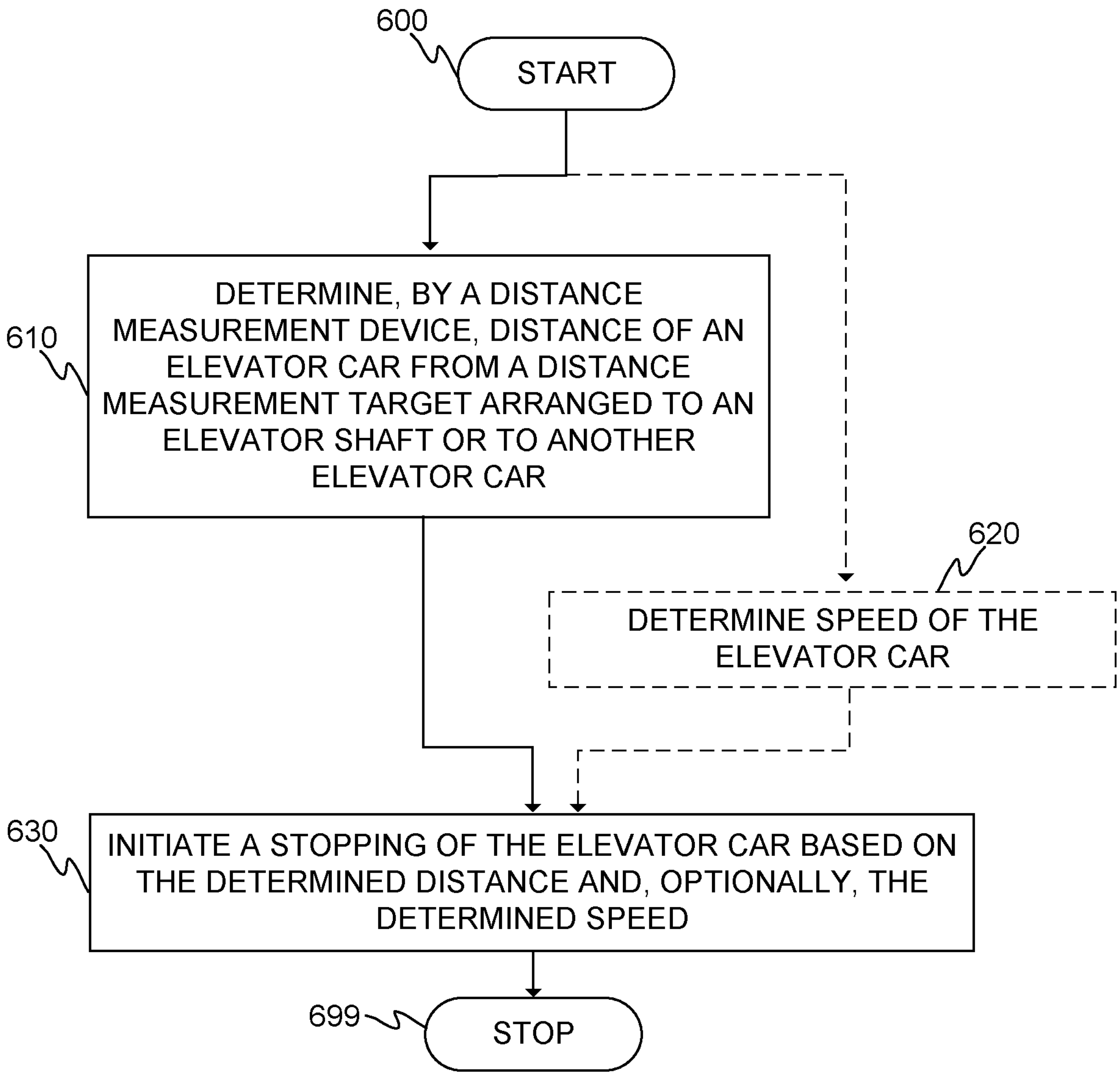
FIG. 5 shows a flow diagram of a method according to an embodiment of the present invention.

FIG. 5 shows a flow diagram of a method according to an embodiment of the present invention.

Step 600 refers to a start-up phase of the method. Suitable equipment and components are obtained and systems assembled and configured for operation.

Item 610 may refer to determining, by the distance measurement device 50 on the elevator car 10, a distance of the elevator car 10 from a distance measurement target 52 arranged to the elevator shaft 13 or to another elevator car 10.

Optional item 620 may refer to determining a speed of the elevator car 10. Some optional phases of the method are shown with dashed lines in FIG. 6.

Item 630 may refer to initiating a stopping of the elevator car 10 based on the determined distance and, optionally, based on the determined speed.

Method execution may be stopped at 699.

The invention clamed is:

1. An elevator safety system, comprising:

an elevator car safety controller arranged on or at least in mechanical connection with an elevator car;

at least one distance measurement target; and a distance measurement device mounted on the elevator car for determining a distance between the distance measurement target and the distance measurement device, wherein the elevator car safety controller is arranged in connection with the distance measurement device and is configured to generate an output signal based on the determined distance, wherein the distance measurement target is a dynamic flag arranged to change a position between an active position and an inactive position, wherein in the active position, the distance measurement target is arranged so that the distance can be determined by the distance measurement device, and wherein the distance measurement device is one of ultrasonic, infrared proximity, or laser distance measurement device.

2. The elevator safety system of claim 1, wherein the distance is in a direction of the movement of the elevator car.

3. The elevator safety system of claim 2, wherein the at least one distance measurement target is arranged on an elevator car, at an end of the elevator shaft, or to temporarily reserve a section of the elevator shaft for maintenance operations.

4. The elevator safety system of claim 1, wherein the distance measurement target is a static object.

5. The elevator safety system of claim 4, wherein the at least one distance measurement target is arranged on an elevator car, at an end of the elevator shaft, or to temporarily reserve a section of the elevator shaft for maintenance operations.

6. The elevator safety system of claim 1, wherein the at least one distance measurement target is arranged on an elevator car, at an end of an elevator shaft, or to temporarily reserve a section of the elevator shaft for maintenance operations.

7. The elevator safety system of claim 1, further comprising an actuator configured to change a position of the distance measurement target between the active position and the inactive position.

8. The elevator safety system of claim 7, comprising an elevator control unit configured to operate the actuator.

9. The elevator safety system of claim 1, wherein dynamic flag is arranged at a door zone of an elevator shaft or at a turning station of the elevator shaft, or to reserve a section of the elevator shaft for maintenance operations.

10. The elevator safety system of claim 9, wherein the dynamic flag is arranged at the turning station and the active position of the dynamic flag is adapted based on a position of the turning station and/or a status of the turning station locking device.

11. The elevator safety system of claim 1, wherein the elevator car safety controller is configured to determine a speed of the elevator car, and to initiate stopping of the elevator car based on the speed and the determined distance.

12. An elevator system comprising:

a linear motor arranged to move at least one elevator car in an elevator shaft; and the elevator safety system of claim 1.

* * * * *